Aug. 31, 1965    M. H. GROVE    3,203,442
GATE VALVE CONSTRUCTION
Filed Nov. 2, 1961    2 Sheets-Sheet 1
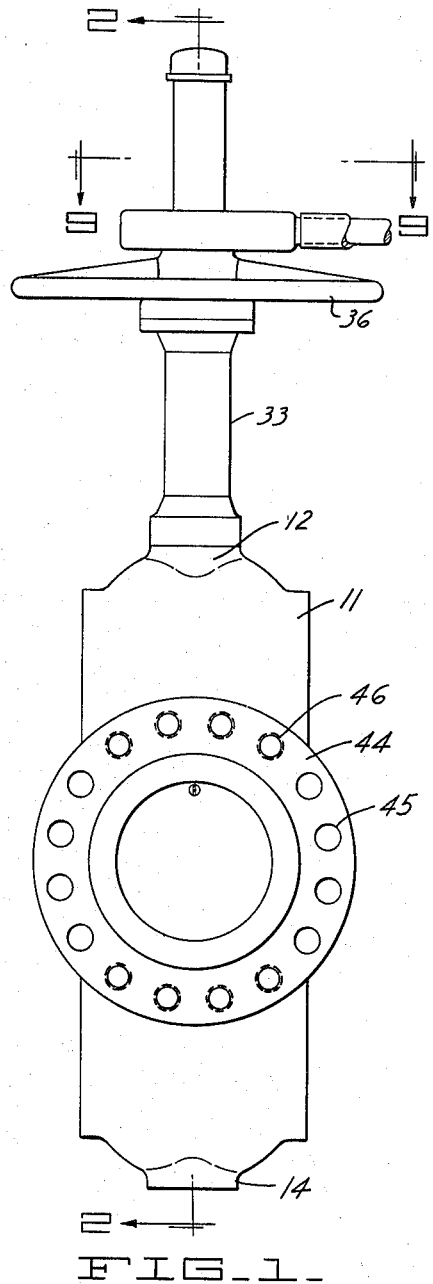
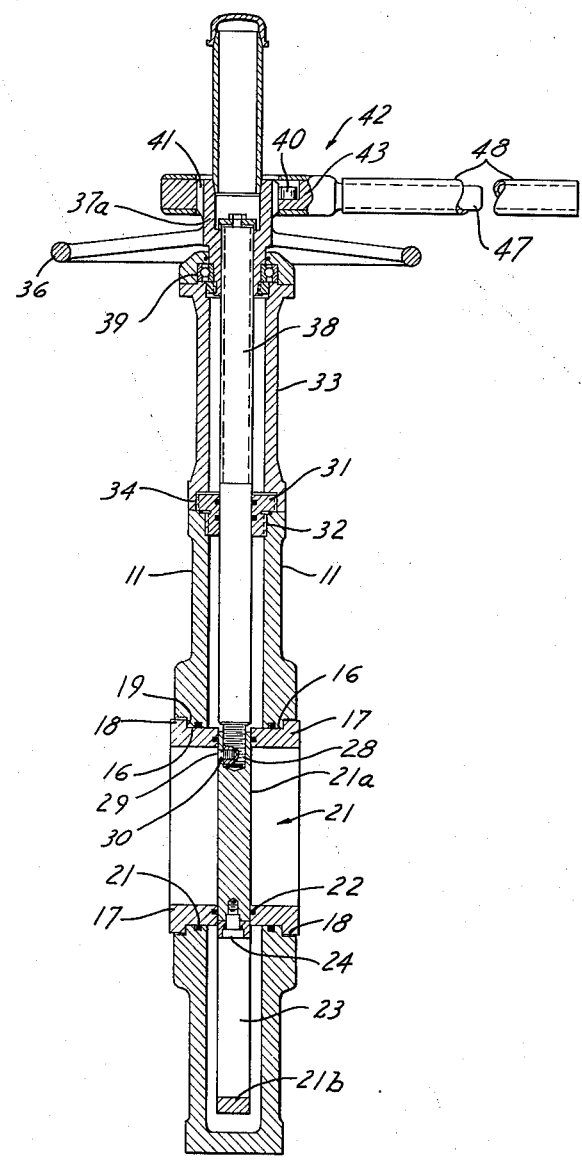
FIG_1_    FIG_2_
INVENTOR.
Marvin H. Grove.
BY
Flehr and Swain
ATTORNEYS

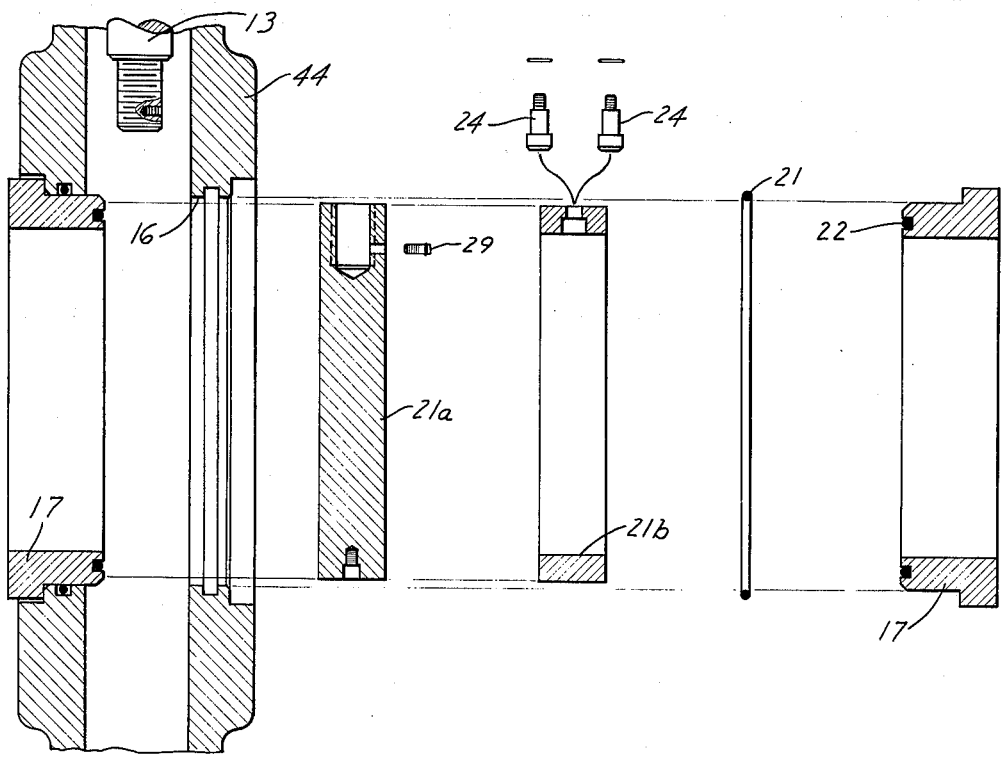
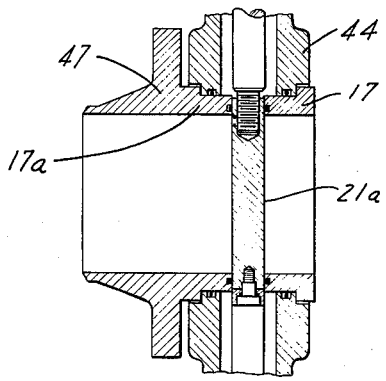
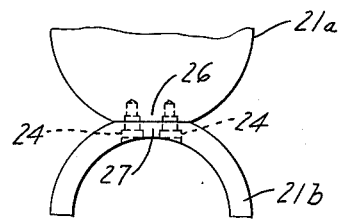

United States Patent Office 3,203,442
Patented Aug. 31, 1965

3,203,442
GATE VALVE CONSTRUCTION
Marvin H. Grove, 340 Hillside Ave., Piedmont, Calif.
Filed Nov. 2, 1961, Ser. No. 149,608
4 Claims. (Cl. 137—315)

This invention relates generally to valves of the gate type for controlling fluid flow.

In the construction of gate valves, it is well known that weight is an important factor in cost of manufacture. Other factors include the cost of labor required for machining, assembly and testing. Gate valves having cast metal (e.g. cast iron, semi-steel or steel) bodies and hubs are customarily made whereby the gate is inserted or withdrawn through the bonnet end of the body. This necessitates a body and bonnet construction which adds considerably to overall weight and requires a substantial amount of machining.

An object of my invention is to provide a valve construction making use of a valve gate of the through port type, which permits assembly or disassembly of the gate through the openings in the side walls of the body, with simplification of the bonnet end.

Additional objects and features of the invention will appear from a following description of which the preferred embodiments have been set forth in detail and in conjunction with the accompanying drawing.

Referring to the drawing:

FIGURE 1 is an end view in elevation, showing a valve in accordance with the present invention.

FIGURE 2 is a cross sectional view taken along the line 2—2 of FIGURE 1.

FIGURE 3 is an exploded view in section on an enlarged scale, illustrating how parts of the valve gate can be removed or assembled through one of the body passages.

FIGURE 4 is a detail in section illustrating one of the seat rings being formed integral with the pipe coupling hub.

FIGURE 5 is a detail illustrating the connecting means between the two gate portions.

The valve illustrated in FIGURES 1 and 2 consist of a body part which in this instance is formed as a casting, and which is made of suitable metal such as cast iron, semi-steel, or steel, depending upon working pressure requirements. The side walls 11 are relatively flat, and at one end the body is provided with a neck or bonnet portion 12, which is bored to accommodate the operating stem 13.

The side walls 11 are provided with the aligned openings 16, which accommodate the metal seat rings 17. These seat rings are provided with enlarged portions or flanges 18, which normally contact and seat against the shoulders 19 formed on the side walls 11. Suitable means, such as seal rings 21 of the resilient O-ring type, can be provided to prevent leakage between the body and the seat rings.

The valve gate is indicated generally at 21, and consists of two separable portions 21a and 21b. The portion 21a can be formed from a flat plate, such as mill rolled steel, and may have a circular configuration (FIG. 5). It has an outer diameter slightly less than the diameter of the openings 16, and its opposite sides are adapted to seat upon the inner opposed end faces of the seat ring 17. The inner opposed end portions of the seat rings can be provided with seal rings 22 of the resilient type, which provide sealing contact with the gate surfaces.

The gate portion 21b is in the form of an annulus having an outer diameter corresponding to the diameter of the portion 21a, and having an inner opening 23 of a diameter corresponding to the diameter of the flow passages through the seat rings 17. The two gate portions 21a and 21b are removably attached together by suitable means, such as the screws 24. The contacting faces 26 and 27 of the two gate portions can be flattened as illustrated in FIGURE 5, to facilitate their attachment.

For closed position of the gate, it will be noted that the margin of gate portion 21a makes sealing contact with the resilient insert seals 22. When the gate is moved from closed to full open position, the opening 23 in gate portion 21b registers with the flow passages through the seats 17, with the side faces of gate portion 21b engaging the seal rings 22. The operating stem 13 has an inner threaded end 28 which is threaded into the gate portion 21a. A removable lock screw 29 serves to lock the stem against rotation relative to the gate, and is accessible through one of the seat rings 17, as shown in FIGURE 1. Suitable means such as an O-ring 30, prevents leakage about the lock screw.

Instead of using a conventional bonnet gland to prevent leakage past the stem 13, I prefer to employ a coupling bushing 31, which is attached to the reduced body portion 12 as by the threaded connection 32. A tubular extension 33 is also attached to the bushing 31 by threaded connection 34, and serves to mount suitable operating means.

The relatively simple operating means illustrated consists of a hand-wheel 36 which is provided with an integral hub 37. This hub is internally threaded to engage the threaded portion 38 of the stem. Also it is carried by the bearing assembly 39, at the upper end of the tubular extension 33. A portion 37a of the hub 37 is provided with ratchet teeth 41, to cooperate with the ratchet operator 42. This operator can consist of a body 43 which surrounds the ratchet teeth 41, and which carries a pawl 40 whereby when the body 43 is oscillated, the ratchet is engaged and disengaged to turn the hub portion 37a. The body 43 is shown provided with a shank extension 47 upon which a piece of pipe or other extension handle 48 can be applied.

The manner in which the gate can be disassembled or assembled within the valve body, can be made clear by reference to FIGURE 3. Assuming that it is desired to remove the gate, it is first moved to a full opened position, with the apportion 21b in alignment with the body passages. One or both of the seat rings 17 is now removed from the body, after which the screws 24 are removed to disconnect the two gate portions. The portion 21b is now removed through one side of the body, after which the gate portion 21a is moved to the full closed position shown in FIGURE 2. Screw 29 is now removed, after which the stem 13 is unscrewed from the gate portion 21a. The portion 21a is now free for removal through the side of the body. The parts of the gate can be assembled in the same general manner described above, starting with attachment of the gate portion 21a to the stem 13, application of the locking screw 29, then, after moving portion 21a to full open position, application of the gate portion 21b with attachment to 21a by screws 24. The seat 17 is then applied to complete the valve.

It will be apparent that various expedients can be used for coupling piping to the valve described above. In the construction illustrated the side walls are provided with enlarged annular portions 44 which are provided with drilled and tapped holes 45 and 46 adapted to receive bolts and studs. The pipe flanges can bear directly against the outer end faces of the seat rings 17.

In the embodiment shown in FIGURE 4, in place of one of the seat rings 17, there is a flanged welding hub 47. The portion 17a of this welding hub, corresponds to the seat ring 17.

In the above described embodiments the seat rings are fitted within openings machined at the side walls of the body. It will be evident that instead of this construction the seat rings can have threaded engagement with the body, whereby when the gate is disassembled as described with reference to FIGURE 3, one of the seat rings must be turned to disengage it from the body.

I claim:

1. In a gate valve construction, a valve body having aligned openings in its side walls, a gate comprising separate solid and ported portions for arresting flow and establishing flow through said body respectively, means for detachably securing said portions together, at least one of said openings being of a diameter greater than the greatest dimension of each of said portions whereby each of said portions can be assembled or disassembled through said opening, and an operating stem having its one end detachably secured to one of said portions.

2. A gate valve construction as in claim 1 in which each of said portions is annular in configuration.

3. A gate valve as in claim 1 in which said portions are detachably secured together by attaching means accessible through the port of said ported annular portion.

4. A valve as in claim 1 in which a rigid seat ring is carried by the valve body for engaging one side of said gate, said seat ring being removable through said one opening in the body.

References Cited by the Examiner

UNITED STATES PATENTS

| | | | |
|---|---|---|---|
| 1,960,127 | 5/34 | Smith | 251—329 |
| 2,344,747 | 3/44 | Sperry | 137—315 |
| 2,636,713 | 4/53 | Hamer | 137—315 |
| 2,982,514 | 5/61 | Bryant | 251—329 |
| 3,038,489 | 6/62 | Allen | 137—315 |
| 3,158,352 | 11/64 | Grove | 251—329 |

ISADOR WEIL, *Primary Examiner.*